(12) United States Patent
Sheikh

(10) Patent No.: US 8,884,170 B2
(45) Date of Patent: Nov. 11, 2014

(54) HANDHELD ELECTRONIC LUGGAGE SCALE

(75) Inventor: Haroon Sheikh, Miami, FL (US)

(73) Assignee: 2395954 Ontario Inc., Mississauga, Ontario (CA)

( * ) Notice: Subject to any disclaimer, the term of this patent is extended or adjusted under 35 U.S.C. 154(b) by 785 days.

(21) Appl. No.: 12/842,867

(22) Filed: Jul. 23, 2010

(65) Prior Publication Data

US 2011/0186356 A1    Aug. 4, 2011

Related U.S. Application Data

(63) Continuation-in-part of application No. 12/829,136, filed on Jul. 1, 2010, now abandoned.

(60) Provisional application No. 61/299,752, filed on Jan. 29, 2010.

(51) Int. Cl.
  *G01G 21/28*  (2006.01)
  *G01G 19/52*  (2006.01)
  *G01G 19/414* (2006.01)

(52) U.S. Cl.
  CPC .............. *G01G 19/414* (2013.01); *G01G 21/28* (2013.01); *G01G 21/283* (2013.01)
  USPC ......................................... 177/148; 177/238

(58) Field of Classification Search
  USPC .............. 177/131, 148, 149, 238; D10/87, 89
  See application file for complete search history.

(56) References Cited

U.S. PATENT DOCUMENTS

| | | |
|---|---|---|
| 1,171,678 A | 2/1916 | Trotter |
| 2,104,935 A | 1/1938 | Solomon |
| 2,536,169 A | 1/1951 | Gray |
| 3,061,057 A | 10/1962 | Miller |
| 3,443,671 A | 5/1969 | Dyke |
| 4,773,515 A | 9/1988 | Kotkins, Jr. |
| 4,916,628 A * | 4/1990 | Kugler .......................... 700/286 |
| D312,352 S | 11/1990 | King |
| 5,031,710 A * | 7/1991 | Parker et al. ............. 177/210 FP |
| 5,358,082 A | 10/1994 | Armstrong, IV |
| D373,105 S | 8/1996 | Imotani |
| 5,594,222 A * | 1/1997 | Caldwell ....................... 200/600 |
| 6,021,874 A | 2/2000 | Nykoluk |
| 6,059,078 A | 5/2000 | Nykoluk |
| 6,062,356 A | 5/2000 | Nykoluk |
| 6,179,101 B1 | 1/2001 | Lin |
| D438,005 S | 2/2001 | Tiramani et al. |
| 6,305,514 B1 | 10/2001 | Lin et al. |
| D462,169 S | 9/2002 | Giovanni |
| 6,460,668 B1 | 10/2002 | Godshaw et al. |

(Continued)

*Primary Examiner* — Randy W Gibson
(74) *Attorney, Agent, or Firm* — Duane Morris LLP

(57) ABSTRACT

A hand-held electronic luggage scale includes a handle designed to be held generally horizontally, and a hook supported by the handle, which extends generally vertically below the handle. The handle houses an electronic scale, the electronic scale connected to the hook for calculating a weight of an object suspended from the hook. The hook may be metal and have a rubber and/or plastic exterior. A touch screen display may be provided in a top surface of the handle that displays the calculated weight from the electronic scale component. The touch screen display may include an icon representing a virtual control button that controls a user-selectable setting, and provides haptic feedback when the user-selectable setting changes due to a user pressing the virtual control button for a predetermined period of time. The touch screen display may include icons that control power, illumination, units of measurement, and/or other functionality.

15 Claims, 8 Drawing Sheets

(56) References Cited

U.S. PATENT DOCUMENTS

| | | | |
|---|---|---|---|
| D479,648 S | 9/2003 | De Lathouwer | |
| 6,695,107 B2 | 2/2004 | Godshaw et al. | |
| 6,723,937 B2 * | 4/2004 | Englemann et al. | 200/600 |
| 6,932,427 B2 | 8/2005 | Tamura | |
| D531,411 S | 11/2006 | Fenton et al. | |
| 7,366,607 B2 * | 4/2008 | Nakaishi et al. | 701/431 |
| D575,178 S * | 8/2008 | Thybulle | D10/89 |
| D575,179 S * | 8/2008 | Thybulle | D10/89 |
| 7,550,684 B2 * | 6/2009 | Kritzler | 177/148 |
| 7,692,107 B1 * | 4/2010 | Shotey et al. | 177/131 |
| 7,732,719 B1 * | 6/2010 | Schantz | 177/126 |
| D653,135 S * | 1/2012 | Sheikh | D10/89 |
| 8,090,415 B2 * | 1/2012 | Annambhotla et al. | 455/573 |
| 8,471,824 B2 * | 6/2013 | Kim et al. | 345/173 |
| 2004/0065519 A1 | 4/2004 | Morszeck | |
| 2006/0196743 A1 | 9/2006 | Lin | |
| 2010/0018783 A1 * | 1/2010 | Thompson | 177/126 |
| 2011/0186357 A1 * | 8/2011 | Sheikh | 177/148 |
| 2012/0186926 A1 * | 7/2012 | Sheikh | 190/115 |
| 2012/0222904 A1 * | 9/2012 | Lu | 177/148 |

\* cited by examiner

HANDHELD ELECTRONIC LUGGAGE SCALE

RELATED APPLICATIONS AND PRIORITY

This application is a continuation-in-part of U.S. patent application Ser. No. 12/829,136, filed Jul. 1, 2010, which claims the benefit of U.S. Provisional Application No. 61/299,752, filed Jan. 29, 2010, the entireties of which are hereby incorporated by reference.

FIELD OF THE INVENTION

The present invention relates to a handheld luggage scale, and in particular to a compact, lightweight luggage scale that is easy for a user to hold.

BACKGROUND

Airlines have over time become stricter about luggage size and weight limits, and have introduced high fees for conveying luggage that is over their weight limit. Weight and size limits for luggage can vary from airline to airline, and even by type of flight (for example, international flights typically have a higher weight limit than domestic flights), and a consumer can no longer know in advance whether an item of luggage will meet size and weight restrictions. It has thus become more important to travelers to be able to measure the weight of their luggage before they set out to travel to an airport to check in for a flight. Various consumer-oriented luggage scales have been proposed, but most of the known scales suffer from various drawbacks.

In particular, it is often difficult for people to lift luggage items safely, which luggage scales require them to do. Because they do not necessarily know the proper safe lifting techniques, a person can easily injure their back while lifting luggage, especially if they are not in good physical condition. Most of the known portable electronic scales do not help a person to lift their luggage safely. Also the known scales may have handles which are uncomfortable to hold, may require the person to lift the luggage high up in order to view the weight read-out, and may not allow two-handed operation.

It is therefore desirable to provide novel designs of luggage scales for consumer use, particularly those which are easy to use and which provide ergonomic advantages.

SUMMARY

The invention relates to a handheld electronic luggage scale. The scale includes a handle designed to be held generally horizontally, and a hook supported by the handle, which extends generally vertically below the handle. The handle houses an electronic scale component, the electronic scale component connected to the hook for calculating a weight of an object suspended from the hook. An easy-to-read digital display is provided in a top surface of the handle, the display displaying the calculated weight from the electronic scale component. The hook is supported by the handle at a central portion of the handle such that a user's one or two hands can hold the handle on either side of a hook attachment while leaving the display at the top of the handle visible between the user's hand(s) while the user is holding the handle. The handle is curved downwardly from the central portion of the handle to free ends thereof to provide an ergonomic support for the user to lift the object to be weighed.

In one aspect, a handheld electronic luggage scale may be provided. The handheld electronic luggage scale may include a handle designed to be held generally horizontally, and a curved hook supported by the handle, and extending generally vertically below the handle. The handle may act as a housing for at least one electronic scale component. The electronic scale component may be connected to the curved hook for calculating a weight of an object suspended from the curved hook. The handle may include a display provided in a top surface of the handle that is configured to display the weight calculated by the electronic scale component. The curved hook may be supported by the handle at a central portion of the handle such that a user can hold the handle on either side of a hook attachment with either one or two hands while leaving the display at the top of the handle visible. The bottom surface of the handle may be curved from the central portion the handle to both ends of the handle to provide an ergonomic support for the user to lift the object to be weighed.

In another aspect, a handheld electronic luggage scale may be provided. The handheld electronic luggage scale may include a handle designed to be held generally horizontally and a luggage hook attachment that is centrally located on a bottom surface of the handle. The luggage hook attachment may protrude from the bottom surface of the handle in the downward direction. The handheld electronic luggage scale may include a connector housed within the luggage hook attachment with an opening at one end; a curved hook having a diameter sized to be accepted by the opening of the connector such that the curved hook is supported by the connector and extends generally vertically below the handle; an electronic scale housed within the handle and that is interconnected with the curved hook via the connector for calculating a weight of an object suspended from the curved hook; and a display provided on a top surface of the handle for displaying the calculated weight from the electronic scale component. The bottom surface of the handle is curved from the luggage hook attachment centrally located on the bottom surface of the handle to both longitudinal ends of the bottom surface of the handle to provide an ergonomic support for the user while lifting the object to be weighed. During use, the handheld electronic luggage scale provides for lifting the object to be weighed and then displaying the weight of the object that is calculated by the electronic scale on the display.

In another aspect, a handheld electronic luggage scale may be provided. The handheld electronic luggage scale may include a handle; an electronic scale component configured to weigh an object for which the handle acts as a housing for; a luggage hook attachment that is centrally located on the handle and that protrudes from a bottom surface of the handle in the downward direction; and a connector housed within the luggage hook attachment with an opening at one end. The one end of the connector with the opening may extend below the luggage hook attachment. The handheld electronic luggage scale may include a curved hook having a diameter sized to be accepted by the opening of the connector such that the curved hook is supported by the connector and interconnected with the electronic scale component via the connector. The curved hook may extend generally vertically below the handle. The handheld electronic luggage scale may further include a display provided in a top surface of the handle that is configured to display the weight of the object being lifted via the curved hook that is calculated by the electronic scale component. During use, when an object hooked by the curved hook is lifted via the handle, the electronic scale component calculates a weight of the object and the weight of the object calculated is displayed on the display.

In another aspect, a handheld electronic luggage scale may be provided. The handheld electronic luggage scale may include a handle and a connector. A top portion of the connector may be housed within the handle. A bottom portion of the connector may extend from a bottom of the handle. The bottom portion of the connector may have an opening or hole. The handheld electronic luggage scale may have a circular hook having a diameter sized to be accepted by the opening of the bottom portion of the connector such that the circular hook is vertically supported by the connector and extends below the bottom of the handle. The circular hook may have a radial curvature of at least approximately 180 degrees. The handheld electronic luggage scale may include an electronic scale component that is housed within the handle. The electronic scale component may be interconnected with the connector and configured to calculate a weight of an object suspended from the circular hook. An electronic display may be provided in a top surface of the handle and be approximately flush with the top surface of the handle. The display may be configured to display the calculated weight from the electronic scale component and configured to change illumination. The electronic scale component may include two control buttons provided in the top surface between a first end of the handle and the display provided in the top surface of the handle; and a battery hatch in the top surface of the handle between the display provided in the top surface of the handle and a second end of the handle, the second end of the handle being opposite the first end of the handle. During use, the handheld electronic luggage scale may calculate the weight of the object suspended from the circular hook and display the weight calculated on the electronic display in the top surface.

In another aspect, a handheld electronic luggage scale may be provided. The handheld electronic luggage scale may include a handle, and a curved hook supported by the handle, and extending generally vertically below the handle. The curved hook may have a metal body and rubber cover covering at least a portion of the metal body. The handle may act as a housing for at least one electronic scale component that may be connected to the curved hook for calculating a weight of an object suspended from the curved hook. The luggage scale may include a touch screen display provided in a surface of the handle. The touch screen display may be configured to display (a) the weight of the object calculated by the electronic scale component, and (b) a virtual control button within the touch screen display. The virtual control button within the touch screen display may be configured to change a user-selectable setting of the handheld electronic luggage scale when a user presses the virtual control button for a predetermined period of time.

In another aspect, a handheld electronic luggage scale may be provided. The handheld electronic luggage scale may include a handle; a luggage hook attachment that may be centrally located on a bottom surface of the handle and protruding from the bottom surface of the handle in the downward direction; a connector housed within the luggage hook attachment with an opening at one end; and a curved hook having a diameter sized to be accepted by the opening of the connector such that the curved hook is supported by the connector and extends generally vertically below the handle. The luggage scale may include an electronic scale housed within the handle that may be interconnected with the curved hook via the connector and configured to calculate a weight of an object suspended from the curved hook. The luggage scale may also include a touch screen display that is provided on a surface of the handle, and configured to display (1) the calculated weight from the electronic scale component, and (2) an icon representing a virtual control button. The virtual control button may be configured to adjust a user-selectable setting when a user touches the icon representing the virtual control button for a predetermined period of time, such as a short or a long press of the virtual control button.

In another aspect, a handheld electronic luggage scale may be provided. The handheld electronic luggage scale may include a handle, and an electronic scale component configured to weigh an object. The handle may act as a housing for the electronic scale component. The luggage scale may include a luggage hook attachment that is centrally located on the handle and protrudes from a bottom surface of the handle in the downward direction. The luggage scale may include a connector housed within the luggage hook attachment with an opening at one end of the connector extending below the luggage hook attachment, and a curved hook having a diameter sized to be accepted by the opening of the connector such that the curved hook is supported by the connector and interconnected with the electronic scale component via the connector. The curved hook may extend generally vertically below the handle and be at least partially covered with a rubber material. The luggage scale may include a touch screen display provided in a top surface of the handle. The touch screen display may be configured to display the calculated weight of the object being lifted via the curved hook from the electronic scale component. The touch screen display may include an icon representing a virtual control button that (1) controls a user-selectable setting, and (2) provides at least one of auditory, visual, and haptic feedback when the user-selectable setting changes due to a user pressing the virtual control button for a predetermined period of time, such as either a long or a short press.

BRIEF DESCRIPTION OF THE DRAWINGS

There are shown in the drawings arrangements which are presently discussed, it being understood, however, that the invention is not limited to the precise arrangements and instrumentalities shown, wherein.

DETAILED DESCRIPTION OF THE INVENTION

Figure 1:
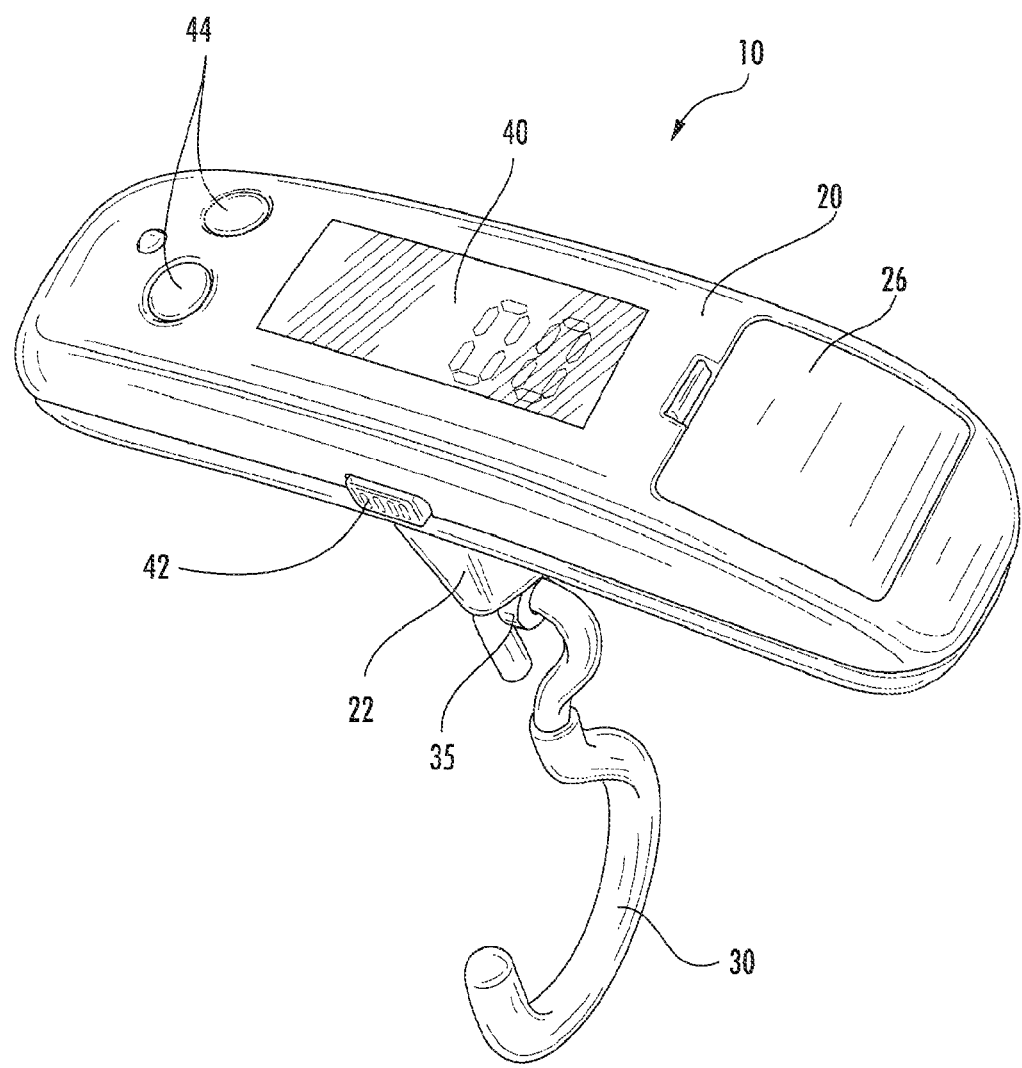
FIG. 1 illustrates an exemplary top perspective view of a handheld electronic luggage scale according to the present embodiments.

The present invention is directed to a handheld electronic luggage scale, and in particular to a compact, lightweight luggage scale that is easy for a user to hold. The term "luggage" as used herein is not meant to be limiting, as the luggage scale can be used for anything that can be hung from a hook. For example, the term "luggage" may cover a suitcase, a briefcase, a laptop bag/case, a computer bag/case, a business case, a travel bag, a beauty case, or a variety of other types of luggage. The scale can also be used with packages, parcels and other items that a user may wish to weigh prior to shipping or posting.

Referring to the drawings, a handheld electronic luggage scale 10 is shown, comprising a handle 20 having a hook attachment 22, a coated luggage hook 30 and an easy-to-read display 40. The handle 20 is designed to be held generally horizontally, with the hook attachment 22 extending generally vertically from the bottom of the handle 20, at a central portion of the handle.

The handle 20 is designed to be small enough to fit snugly within a user's two hands, or a single hand, as they are held in front of the body. In one arrangement, the handle 20 can be approximately 4-5" long. The handle can also be picked up with one hand if desired, with the luggage hook attachment 22 passing between the middle fingers. The handle 20 is designed with a slight curve so that ends 24 of the handle 20 on either side of the central hook attachment 22 curve slightly downwardly. The ends 24 can have a greater angle of curvature from horizontal than a central portion of the handle 20. The handle 20 has a suitable length and width so that it fits comfortably in a user's hand or hands.

The handle 20 serves as a housing for internal components and can also include a battery hatch 26. Batteries within the hatch 26 provide power to an electronic scale component (not shown) that is stored within the handle 20. The scale component is also connected to the luggage hook 30 by means of a connector 35 that extends within the hook attachment 22. The luggage hook 30 may be simply hooked through an aperture provided in a free end of the connector 35. As the connector 35 is pulled downwardly, the electronic scale component registers the force acting on the connector 35, and thus the weight of an object that is suspended from the hook 30.

An easy-to-read widescreen digital display 40 is provided on top of the handle 20. The display 40 displays the luggage weight in numbers large enough to be easily viewed by a person holding the handle 20 at about waist height. The display 40 can be an LCD display and it can have blue back lighting for ease of viewing. Of course, any suitable display may be used, and the invention is not limited in this regard. An on/off switch 42 may be provided on the side of the handle 20, and one or more control buttons 44 can be provided on the top of the handle 20. After turning the main on/off switch 42 on, one of the control buttons 44 allows the user to activate the scale 10 to provide a readout of the weight once an item of luggage 50 has been picked up. The electronic scale component reads the weight of the luggage 50 instantly, and can beep as it provides the readout. The display 40 can also change color, for example, to red, when the readout is provided. This provides the user quick notification that the weight reading is completed and that they can set the luggage item 50 back down on the ground. A second control button 44 allows the weight display to be toggled between kilograms and pounds.

Figure 3:
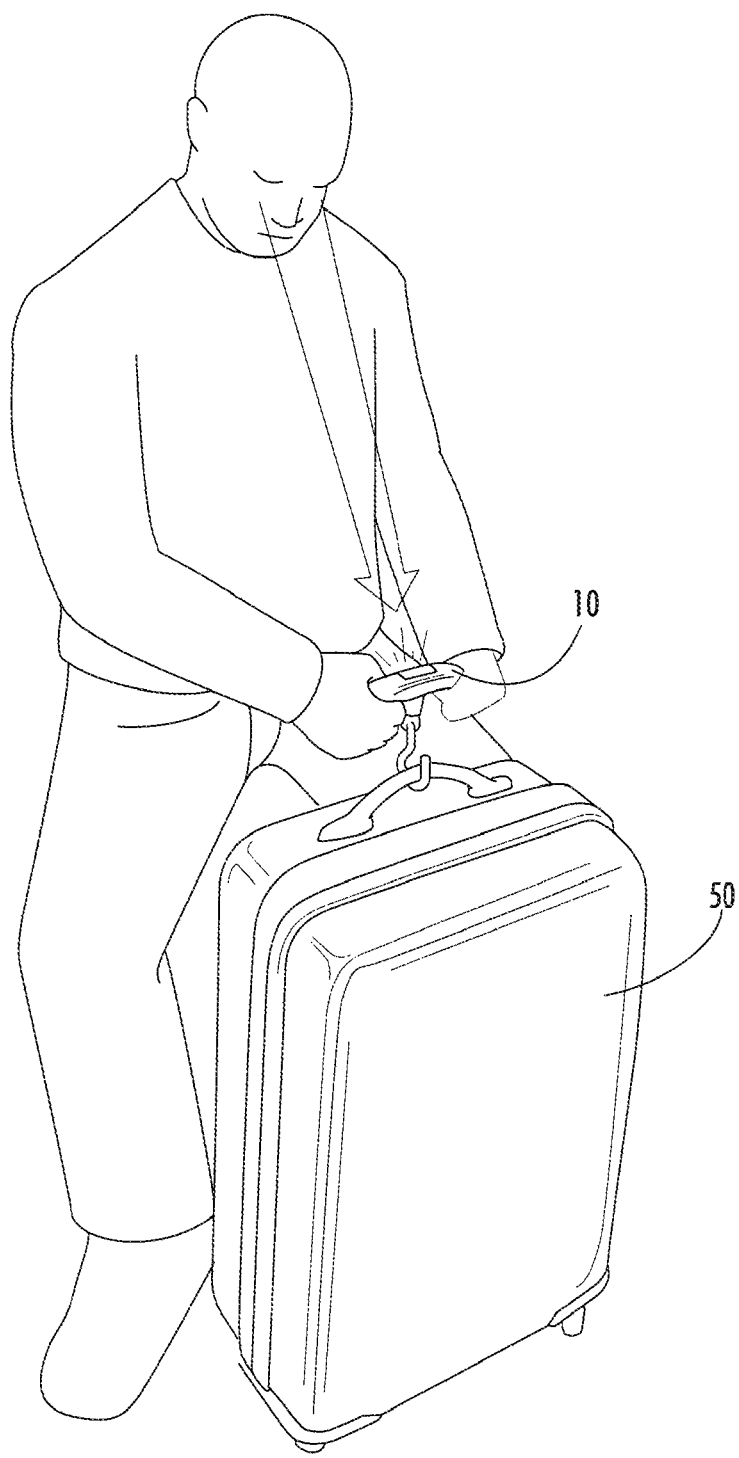
FIG. 3 illustrates an exemplary view illustrating two-hand operation of the handheld electronic luggage scale.

The curvature of the handle 20 is designed to provide both comfort and a secure grip to a user, and to assist with safe lifting techniques which should always be practiced to properly lift objects and reduce back strain. This operation is shown in FIG. 3. The user stands close to an item of luggage 50 to be weighed, with their legs shoulder-width apart. The user centers themselves with the electronic scale 10 comfortably resting in their hands. The user connects the hook 30 to a carry handle of the luggage 50. The luggage 50 is then lifted by the user while closely holding the arms to their body, preferably bending their legs while keeping their back straight. As a person raises their arms along their midline, the hands naturally define a greater and greater angle from the horizontal as their elbows splay, and the curvature of the handle 20 of the scale 10 allow for this operation to be carried out comfortably while the user maintains the weight of the luggage 50 evenly across the width of their hands. It has been found that with a straight handle, as the user raises their hands, the weight of the luggage 50 becomes more focused on the ulnar edges of the hands, which can quickly become painful.

Alternatively or additionally, with respect to FIG. 3, the user may operate the handheld electronic luggage scale 10 with one hand. The user may grip the scale 10 with one hand such that the user may be able to view the weight of an object being calculated by the scale 10 and that is being displayed on the display on the top surface of the scale 10. For instance, the display may be viewable between a user's thumb and index finger when gripping the luggage scale 10 with one hand. The one-hand operation may be useful for smaller and/or lighter items as compared to the two-hand operation. The digital display may be sufficiently large to permit viewing of the calculated weight from a distance, such as when the user is hold the luggage scale 10 at arm's length during use or about waist high.

Figure 4:
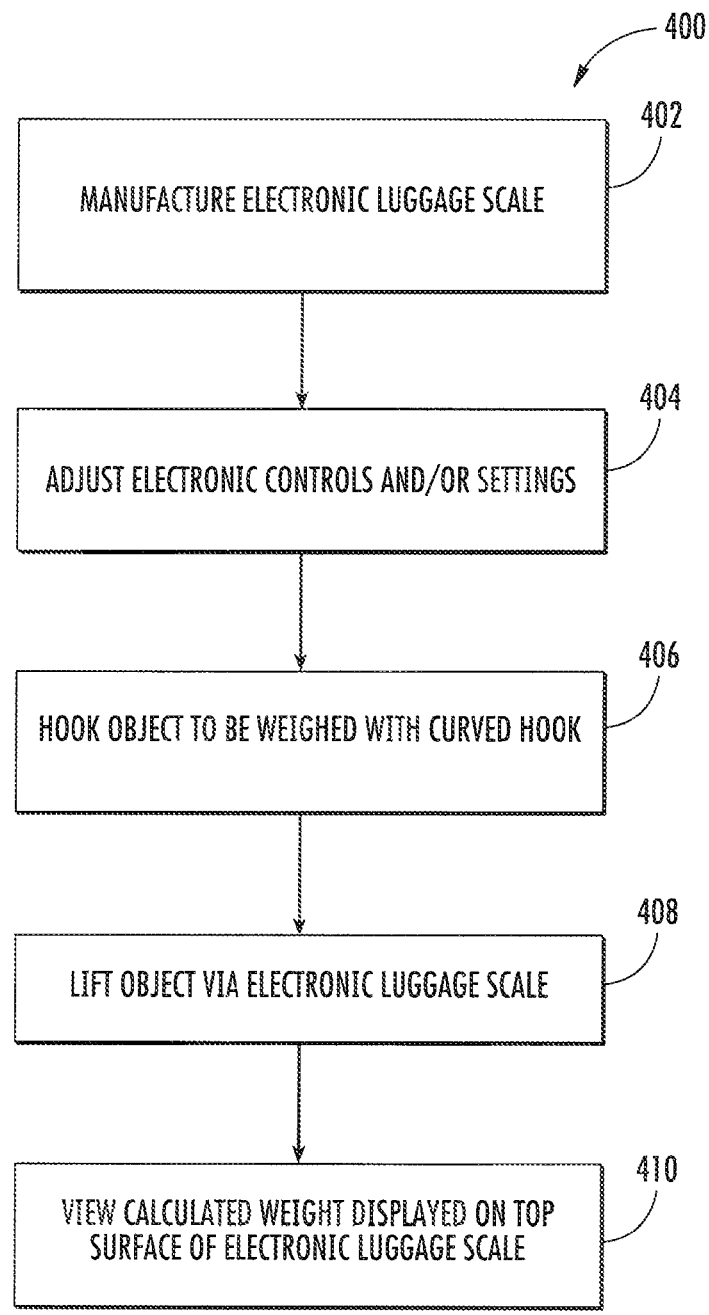
FIG. 4 illustrates an exemplary method of use of the handheld electronic luggage scale.

FIG. 4 depicts an exemplary method of using the handheld electronic luggage scale 400. The method 400 may include manufacturing the handheld electronic luggage scale 402, attaching the scale to an object to be weighed 406, adjusting controls and/or settings on the scale 404, lifting the scale and object 408, and viewing the weight of the object being weighed 410. The method may include additional, fewer, or alternate actions.

The method of using the handheld electronic luggage scale 400 may include manufacturing the handheld electronic luggage scale 402. The handheld electronic luggage scale may be manufactured to include a handle or outer casing for casing an electronic scale. The luggage scale may have a digital display on the top surface of the handle to facilitate viewing a weight displayed during use. The luggage scale may include a hook attachment/connector arrangement on the bottom surface of the handle for either direct or indirect attachment to an object to be weighed. The hook attachment may house a connector that may be interconnected with the electronic scale cased within the handle, such that during use, the electronic scale may weigh the object to be weighed. In one embodiment, a bottom end of the connector extends from the hook attachment and is interconnected with a substantially coated luggage hook. The handle may be designed to be held horizontally during use, with the hook attachment and/or luggage hook extending vertically from the bottom of the handle, preferably in the vicinity of a central portion of the handle.

The handle may be designed to be small enough to fit snugly within a user's hand or hands. The handle may be approximately three to several inches in length, preferably between approximately four to approximately five inches. In one aspect, the handle may be picked up with one hand, with the luggage hook attachment passing between two fingers when the user is gripping the handle.

Figure 2:
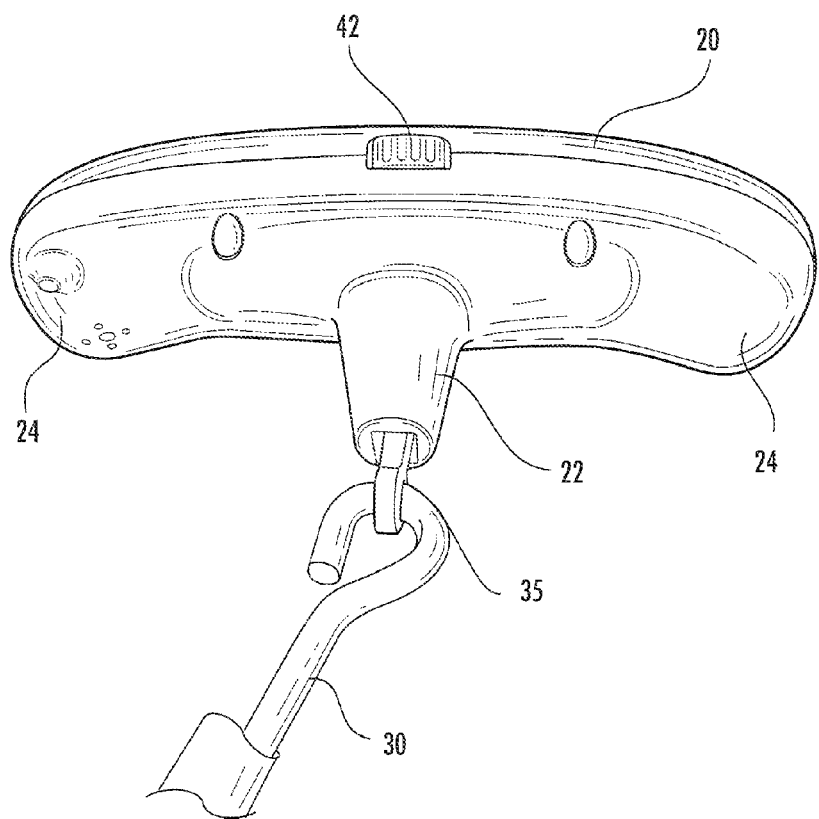
FIG. 2 illustrates an exemplary bottom side perspective view of the handheld electronic luggage scale of FIG. 1.

As shown with respect to FIG. 2, in one embodiment, the luggage hook attachment 22 may be centrally located on the handle 20 and protrude from the bottom of the handle 20. The luggage hook attachment 22 may be generally cylindrical, or tapered and/or funnel shaped with a smooth exterior. The luggage hook attachment 22 may extend from a mid-section of the bottom surface of the handle 20 for approximately 0.25 inches to approximately 2.00 inches. Other sizes may be used. The radius of the luggage hook attachment 22 may be greater in the vicinity of the interconnection of the luggage hook attachment with the bottom of the handle, and smaller in the vicinity of the tip of the luggage hook attachment 22. The tip of the luggage hook attachment 22 may have an a square, round, or other opening leading to a hollow cavity interior of the luggage hook attachment 22.

Further with respect to FIG. 2, the handle may be configured to have a connector 35 that protrudes or extends from the tip or bottom of the luggage hook attachment 22. The connector 35 may be substantially housed within the interior of the luggage hook attachment 22. The connector 35 may have a circular opening at the bottom end configured to accept a luggage hook 30. The opening of the connector 35 may be approximately perpendicular or parallel to the longitudinal length of the handle 20.

As shown in FIG. 2, the luggage hook 30 may have a large, circular hook for hooking luggage and other items, such as by handles on the items to be lifted. The large, circular hook may be coated with a rubber or plastic material. The large, circular hook of the luggage hook 30 may transition to a smaller connector hook. The smaller connector hook may sized to be accepted by the opening of the connector 35 that extends from the luggage hook attachment 22. The transition portion of the luggage hook 30 may having a twisting effect and transition or re-orientate the alignment of the smaller connector hook, which may run approximately parallel to the longitudinal length of the handle 20, by approximately 90 degrees, such that the alignment of the larger, circular hook is approximately perpendicular to the longitudinal length of the handle 20. Other configurations and orientations may be used.

The handle may have a slight curve such that the two longitudinal ends of the handle on either side of the central hook attachment curve slightly downward. The top surface of the handle may curve slightly downward from a central or mid-section to both longitudinal ends of the top surface. The bottom surface of the handle may curve slightly upward and then curve slightly downward from a central or mid-section to both longitudinal ends of the bottom surface, as shown in FIG. 2.

The handheld electronic luggage scale may be manufactured to have a battery hatch located in a top or other surface of the handle. The battery hatch may be located between an electronic display, such as a centrally located or other electronic display on the top surface of the handle, and one longitudinal end of the handle of the scale. The batteries within the hatch may power the electronic scale housed within the handle.

The method of using the handheld electronic luggage scale 400 may include adjusting controls and/or settings on the scale 404. The handle may include an on/off switch for turning the electronic luggage scale on and off. The handle also may include one or more control buttons on the top or other surface of the handle. Two control buttons may be located between the electronic display, such as a centrally located or other electronic display on the top surface of the handle, and the other longitudinal end of the top surface of the handle— the other longitudinal end of the top surface of the handle being opposite the longitudinal end of the top surface of the handle that is closest to the battery hatch.

The user may be able to grab the electronic luggage scale with one hand and operate either of the two control buttons with his or her thumb, similar to remote control operation of a television set. One control button may allow the user to activate the scale and provide a readout of the weight once an item of luggage has been lifted and weighed. The electronic scale component reads the weight of the luggage instantly, and may beep as it provides the readout. The display may be configured to change color or give another indication that a readout is ready for viewing. Another control button may allow the weight display to be toggled between kilograms and pounds, or other units of measurement.

The method of using the handheld electronic luggage scale 400 may include attaching the scale to an object to be weighed 406. The electronic scale component may be interconnected to a luggage hook either directly or indirectly. For example, the luggage hook may be interconnected with a connector or other means that connects the luggage hook to the handheld electronic luggage scale. In one embodiment, the hook supported by the handle may interconnected with the handle via a connector having a vertical alignment that is offset from a vertical alignment of the hook by approximately 90 degrees. The luggage hook may be slid through an aperture on the connector and then hook a handle on a piece of luggage or suitcase, such that the piece of luggage or suitcase is sufficiently attached to the handheld electronic luggage scale.

The hook may be a curved or circular hook. The curved or circular hook may be manufactured of metal, plastic, or other material. The curved hook may include a bottom or large hook portion, and a top or small hook portion. Both the large hook portion and the small hook portion may be configured as curved or circular hooks.

The large hook portion may have a bottom curved hook extending at least approximately 180 degrees radially. In one embodiment, the bottom curved hook may extend approximately 270 degrees radially or have 270 degrees of curvature for hooking or grabbing an object. The bottom curved hook may be configured to be sufficiently strong such that the bottom curved hook may hook a handle or strap on an object, and then be used in conjunction with the handle to lift the object.

The curved hook may include a top or small hook portion having a top curved hook extending from the large hook portion. The vertical alignment of the small hook portion and the vertical alignment of the large hook portion may be approximately 90 degrees offset with respect to each other. The top or small hook portion may have a vertical alignment that is approximately parallel to the longitudinal length of the handle. The bottom or large hook portion may have a vertical alignment that is approximately perpendicular to the longitudinal length of the handle. Other vertical alignments of the top and bottom hook portions may be used.

The method of using the handheld electronic luggage scale 400 may include lifting the scale and object 408. During use, as the user lifts the object using the handle of the luggage scale, the connector may be pulled downward. As a result, the electronic scale component may register the force acting on the connector, and thus the weight of an object that is suspended from the hook may be calculated. The electronic scale may provide an audible and/or visual indication that the weight of the object has been calculated and is being displayed. For instance, the display may change background color or an indicator light may light up to provide a user notification that the weight reading is complete. The indicator light may be located on the surface of the handle between two control buttons and one longitudinal end of the top surface of the handle.

The method of using the handheld electronic luggage scale 400 may include viewing the weight of the object being weighed 410. The top surface of the handle, or another surface of the handle, may include a digital display. The digital display may have a square or other shaped display screen. The display may display luggage weight in numbers large enough to be easily viewed by a person holding the handle at about waist height. The display may be a LCD display and may have colored lighting for ease of viewing. The digitally displayed numbers may be displayed vertically or horizontally with respect to the length of the handle. In one embodiment, the user may lift the object to be weighed via the handle using one hand while simultaneously being able to view the digital display that is displaying the weight of the object calculated by the electronic scale. In another embodiment, the user may lift the object to be weighed via the handle using two hands while simultaneously being able to view the digital display that is displaying the weight of the object calculated by the electronic scale.

In one exemplary embodiment, the handheld electronic luggage scale may include a handle; an electronic scale component configured to weigh an object for which the handle acts as a housing for; a luggage hook attachment that is centrally located on the handle and that protrudes from a bottom surface of the handle in the downward direction; and a connector housed within the luggage hook attachment with an opening at one end. The one end of the connector with the opening may extend below the luggage hook attachment. The handheld electronic luggage scale may include a curved hook having a diameter sized to be accepted by the opening of the connector such that the curved hook is supported by the connector and interconnected with the electronic scale component via the connector. The curved hook may extend generally vertically below the handle. The handheld electronic luggage scale may further include a display provided in a top surface of the handle that is configured to display the weight of the object being lifted via the curved hook that is calculated by the electronic scale component. During use, when an object hooked by the curved hook is lifted via the handle, the electronic scale component calculates a weight of the object and the weight of the object calculated is displayed on the display.

In another exemplary embodiment, the handheld electronic luggage scale may include a handle and a connector. A top portion of the connector may be housed within the handle. A bottom portion of the connector may extend from a bottom of the handle. The bottom portion of the connector may have an opening or hole. The handheld electronic luggage scale may have a circular hook having a diameter sized to be accepted by the opening of the bottom portion of the connector such that the circular hook is vertically supported by the connector and extends below the bottom of the handle. The circular hook having a radial curvature of at least approximately 180 degrees. The handheld electronic luggage scale may include an electronic scale component that is housed within the handle. The electronic scale component may be interconnected with the connector and configured to calculate a weight of an object suspended from the circular hook. An electronic display may be provided in a top surface of the handle and be approximately flush with the top surface of the handle. The display may be configured to display the calculated weight from the electronic scale component and configured to change illumination. The electronic scale component may include two control buttons provided in the top surface between a first end of the handle and the display provided in the top surface of the handle; and a battery hatch in the top surface of the handle between the display provided in the top surface of the handle and a second end of the handle, the second end of the handle being opposite the first end of the handle. During use, the handheld electronic luggage scale may calculate the weight of the object suspended from the circular hook and display the weight calculated on the electronic display in the top surface. The weight calculated may be displayed and viewable by the user while the user is still lifting the object. The weight calculated may also be displayed and viewable by the user after the user puts the object down. Embodiments having additional, fewer, or alternate features may be used.

I. Touch Screen Display

The electronic luggage scale disclosed herein may further be configured to include a touch screen display in addition to or instead of the displays utilized in the embodiments described above. Additionally, the luggage hook utilized in the present disclosure may also be configured to be covered with rubber and/or plastic. In one embodiment, a handheld electronic luggage scale may include a handle, and a curved hook supported by the handle, and extending generally vertically below the handle. The curved hook may have a metal body and rubber cover covering at least a portion of the metal body. The handle may act as a housing for at least one electronic scale component that may be connected to the curved hook for calculating a weight of an object suspended from the curved hook. The luggage scale may include a touch screen display provided in a surface of the handle. The touch screen display may be configured to display (a) the weight of the object calculated by the electronic scale component, and (b) a virtual control button within the touch screen display. The virtual control button within the touch screen display may be configured to change a user-selectable setting of the handheld electronic luggage scale when a user presses the virtual control button for a predetermined period of time.

Further, the touch screen display may be provided in a top surface of the handle and the virtual control button may be visually depicted on the touch screen display as a circular or other icon. The virtual control button may provide auditory, visual, haptic or vibrational feedback once a user-selectable setting of the virtual control button changes.

Referring to the drawings and in particular FIGS. 5-8, an electronic luggage scale 500 featuring a touch screen display is schematically illustrated. The electronic luggage scale 500 may be utilized to weigh luggage and/or other objects that a user desires to weigh. Notably, the electronic luggage scale 500 may include a handle 505 and a luggage hook 510, which may be configured to be suspended from the handle 505 of the electronic luggage scale 500. Handle 505 may be configured to act as a housing for one or more electronic scale components (not explicitly shown) for calculating the weight of various objects, which may be connected to and held by the luggage hook 510. In an embodiment, the handle 505 may be approximately four inches long, however, other lengths are also contemplated according to the present disclosure. The luggage hook 510, in an embodiment, may be centrally located with respect to a bottom surface of the handle 505. Additionally, the bottom surface of the handle 505 may be curved from a central portion of the handle 505 to both ends of the handle so as to provide ergonomic support for a user lifting an object using the luggage scale 500.

The luggage hook 510 may be generally curved and may be utilized to hold luggage and/or other objects therefrom. Also, the luggage hook 510 may extend generally vertically below the handle 505 and may comprise a metal body. Notably, the metal body may have a rubber and/or plastic cover that may cover at least a portion of the metal body of the luggage hook 510. In addition to the luggage hook 510, the luggage scale 500 may further include a physical on/off switch 520, which may be shifted left or right to turn the electronic luggage scale off or on. The luggage scale 500 may be also configured to include a touch screen display 530. The touch screen display 530 may be configured to perform a variety of functions upon being touched by a user such as, but not limited to, displaying the calculated weight of an object suspended from the luggage scale 500.

Figure 5:
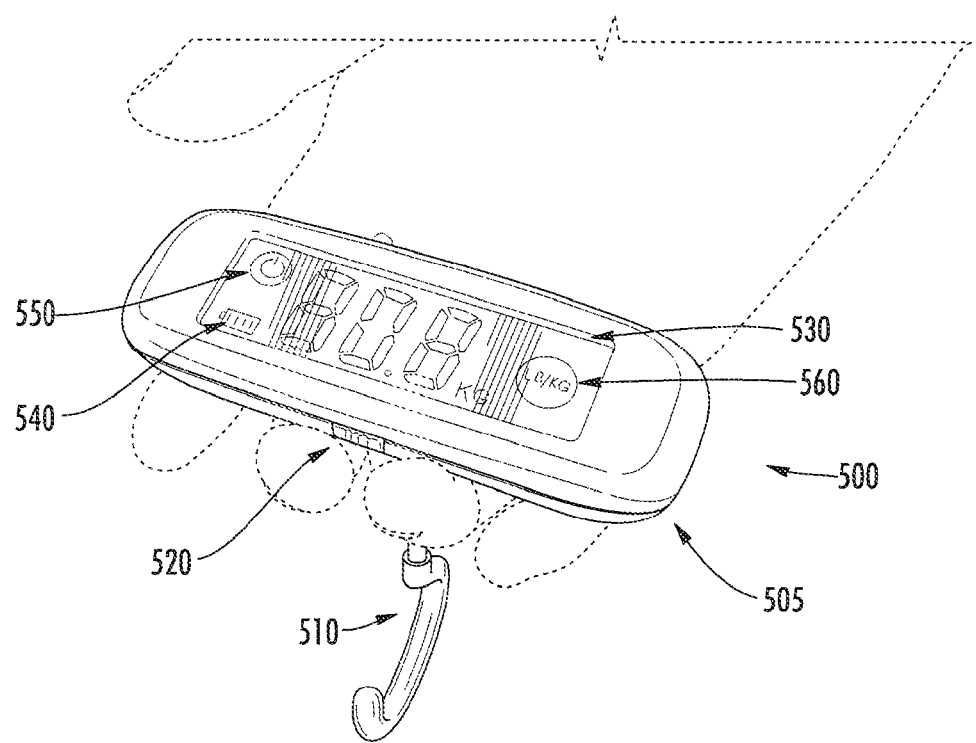
FIG. 5 illustrates an exemplary perspective view of a handheld electronic luggage scale featuring a touch screen display according to the present embodiments.
Figure 6:
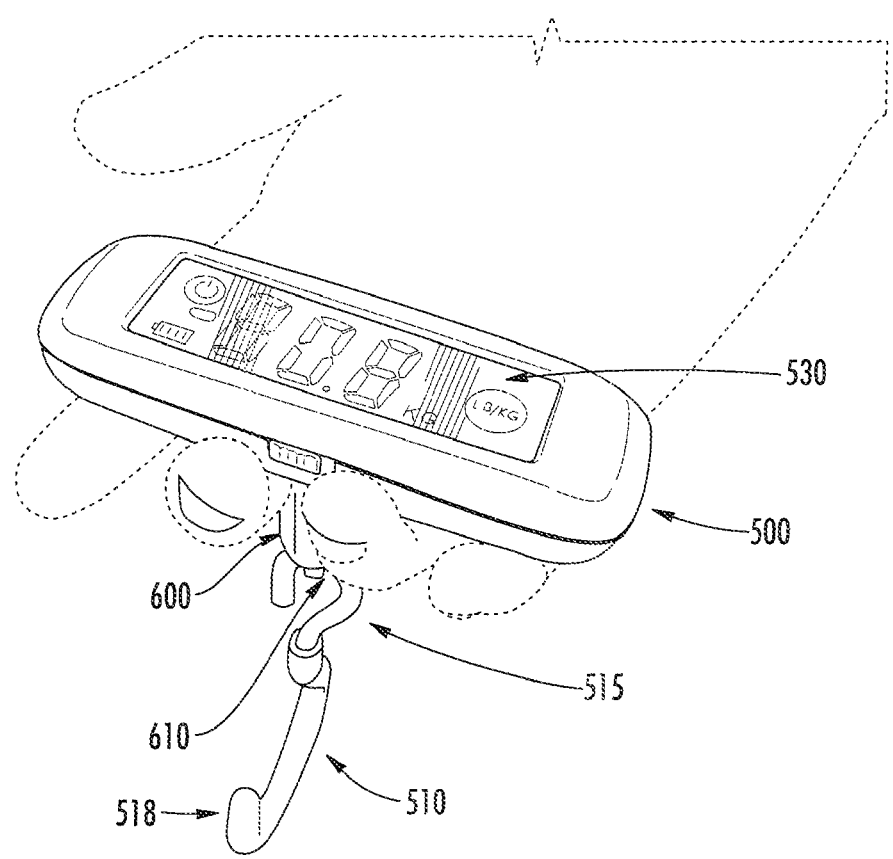
FIG. 6 illustrates an exemplary view illustrating a handheld electronic luggage scale featuring a touch screen display along with a luggage attachment and hook.
Figure 7:
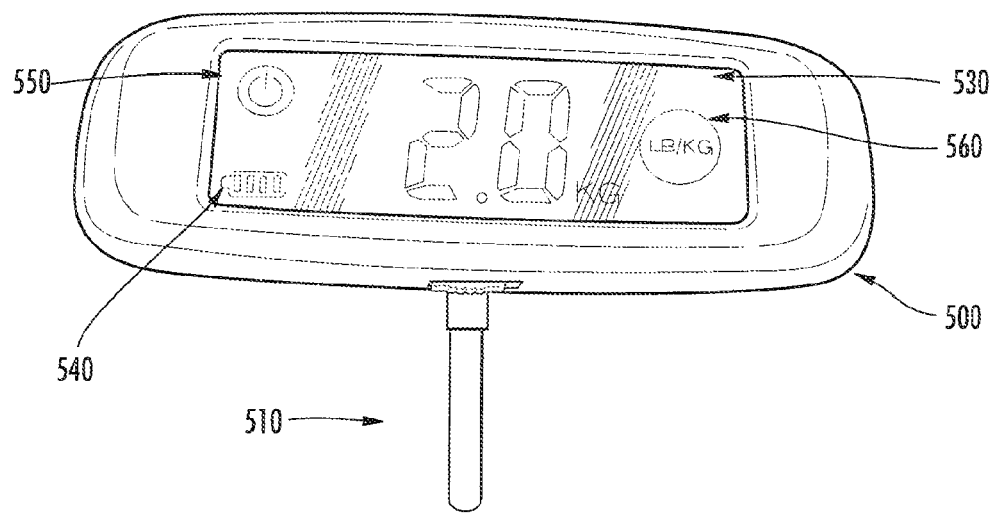
FIG. 7 illustrates an exemplary top view of a handheld electronic luggage scale featuring a touch screen display with virtual buttons according to the present embodiments.
Figure 8:
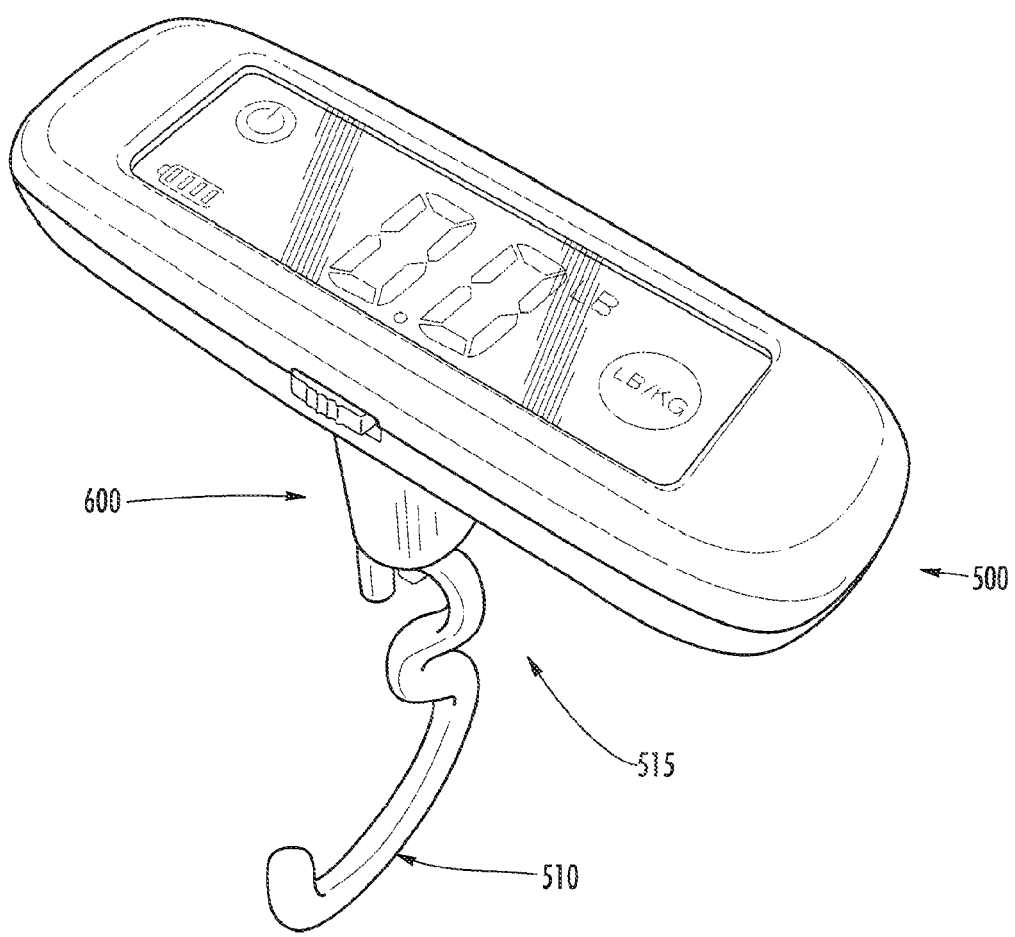
FIG. 8 illustrates an exemplary view of a handheld electronic luggage scale featuring a touch screen display and hook.

As illustratively shown in FIG. 5, the touch screen display 530 may be located along a top surface of the handle 505, however, other locations are also contemplated. Such a location may allow a user to readily view the weight of an object suspended from the luggage scale 500 with relative ease while lifting the scale and object. The touch screen display 530 may include a virtual battery gauge 540 which can display the amount of battery power remaining in the luggage scale 500. In an embodiment, the virtual battery gauge 540 may display the remaining battery power by displaying an icon resembling a battery. The icon may include a plurality of bars signifying full battery power when the battery is fully charged. As the battery power of the luggage scale 500 gradually decreases, the bars may begin to disappear eventually displaying zero bars when the luggage scale 500 no longer has battery power remaining. In addition to or instead of displaying a plurality of bars to show battery power, the battery power can be displayed via a percentage of full battery power. For example, the touch screen display 530 may display that there is only 50% battery power remaining in the luggage scale 500 when half of the battery power is remaining.

The touch screen display 530 may also include one or more virtual buttons, which may be displayed via the touch screen display 530 such as by visually displaying an icon associated with the virtual button. The virtual buttons may be utilized to allow a user to change one or more user-selectable settings of the electronic luggage scale 500 and may be visually displayed via the touch screen display 530. One of the virtual buttons may be a virtual on/off button 550. A user may press the virtual on/off button 550 for a predetermined period of time to turn the luggage scale 500 on or off. For example, upon pressing the virtual on/off button 550 for a few seconds, the luggage scale 500 can turn on, and, similarly, when the luggage scale 500 is on, upon pressing the virtual on/off button 550 for a few seconds, the luggage 500 can turn off. The touch screen display 530 may also feature a virtual metric button 560. Upon being touched by a user, the virtual metric button 560 may switch between various units of measurements. For example, if the luggage scale is currently set to weigh luggage or other objects in pounds, a user may press the virtual metric button 560 to toggle the metric to kilograms if the user so desires.

The touch screen display 530 may also include a virtual button to allow a user to adjust the background color of the display. If the display is currently displaying content in red, the user may press a virtual button to change the display content to blue or some other color for instance. Additionally, other virtual buttons may be included which may allow a user to configure other settings associated with the luggage scale 500. For example, the virtual buttons described above and/or another virtual button may be provided which allows a user to set a sound, visual image, background color, or haptic feedback to be produced when the luggage scale 500 has finished measuring the weight of an object suspended from the luggage scale 500. As an example, the luggage scale may beep, display an image saying "Weight Calculation Complete," display a different background color, or even vibrate upon finishing a weight calculation. Such sounds, visual images, or haptic feedback may also be configured to be produced in response to any of the other functions and features of the luggage scale 500. Also, the user may adjust the amount of decimal places that are displayed to allow for various precision levels associated with the weights being calculated by the luggage scale 500.

In an embodiment, the electronic luggage scale may also include a luggage hook attachment 600. The luggage hook attachment 600 may be centrally located on a bottom surface of the handle 505 and may protrude from the bottom surface of the handle 505 in a generally downward direction. Also, the luggage hook attachment 600 may house a connector 610, a portion of which may have an opening configured to accept a portion of the luggage hook 510 to secure the luggage hook 510 to the luggage scale 500. The luggage hook 510 may have a size and diameter to be accepted into the opening of the connector 610 such that the luggage hook 510 may be supported by the connector 610 and may generally extend vertically below the handle 505. By connecting or otherwise securing the luggage hook 510 to the connector 610, the luggage hook 510 may be interconnected with the electronic scale components which calculate the weight of the objects suspended from the luggage hook 510. The luggage hook 510 itself may have several features to allow the luggage hook 510 to be accepted into or by the opening of the connector 610. For example, the luggage hook 510 may have a small hook portion 515 which may be sized to be accepted by the opening of the connector 610.

The small hook portion 515 may be configured to be at an opposite end of a large hook portion 518 of the luggage hook 510 and may have a top curved hook which may extend from the large hook portion 518. The small hook portion 515 may have a vertical alignment that is approximately parallel to a longitudinal length of the handle 505. The large hook portion 518 may have a vertical alignment that is approximately perpendicular to the longitudinal length of the handle 505 and may be configured to hook the various objects that the user desires to weigh with the luggage scale 500. As an illustration, the large hook portion 518 may be configured to hook a luggage handle of a piece of luggage or a strap of the luggage. By hooking the handle or strap of the luggage, it allows the user to lift the luggage with the luggage scale 500 with relative ease. In an embodiment, the large hook portion 518 may have a bottom curved hook which may extend at least approximately 180 degrees radially.

In another embodiment, a handheld electronic luggage scale may include a handle; a luggage hook attachment that may be centrally located on a bottom surface of the handle and protruding from the bottom surface of the handle in the downward direction; a connector housed within the luggage hook attachment with an opening at one end; and a curved hook having a diameter sized to be accepted by the opening of the connector such that the curved hook is supported by the connector and extends generally vertically below the handle. The luggage scale may include an electronic scale housed within the handle that may be interconnected with the curved hook via the connector and configured to calculate a weight of an object suspended from the curved hook. The luggage scale may also include a touch screen display that is provided on a surface of the handle, and configured to display (1) the calculated weight from the electronic scale component, and (2) an icon representing a virtual control button. The virtual control button may be configured to adjust a user-selectable setting when a user touches the icon representing the virtual control button for a predetermined period of time, such as a short or a long press of the virtual control button.

Further, the touch screen display may be provided on a top surface of the handle. The virtual control button may be an off/on switch. The touch screen display may include a second icon representing a second virtual control button that is configured to switch units of measurement of the object being weighed. The touch screen display may include a battery or fuel gauge. The handle maybe between approximately 3 and approximately 5 inches in length, and the touch screen display may be configured to change colors.

In another embodiment, a handheld electronic luggage scale may be provided. The handheld electronic luggage scale may include a handle, and an electronic scale component configured to weigh an object. The handle may act as a housing for the electronic scale component. The luggage scale may include a luggage hook attachment that is centrally located on the handle and protrudes from a bottom surface of the handle in the downward direction. The luggage scale may include a connector housed within the luggage hook attachment with an opening at one end of the connector extending below the luggage hook attachment, and a curved hook having a diameter sized to be accepted by the opening of the connector such that the curved hook is supported by the connector and interconnected with the electronic scale component via the connector. The curved hook may extend generally vertically below the handle and be at least partially covered with a rubber material. The luggage scale may include a touch screen display provided in a top surface of the handle. The touch screen display may be configured to display the calculated weight of the object being lifted via the curved hook from the electronic scale component. The touch screen display may includes an icon representing a virtual control button that (1) controls a user-selectable setting, and (2) provides haptic feedback when the user-selectable setting changes due to a user pressing the virtual control button for a predetermined period of time, such as either a long or a short press.

The bottom surface of the handle may be curved from the luggage hook attachment that is centrally located to a first and a second longitudinal end of the handle to provide an ergonomic support for the user to lift the object to be weighed. The touch screen display may include two or more icons representing two or more virtual control buttons. Each of the two or more virtual control buttons may be configured to change an associated user-selectable setting. In one embodiment, the virtual control button may be a virtual on and off button. In another embodiment, the virtual control button may change a unit of measurement of the weight of the object being weighed by the electronic scale component. In another embodiment, the user-selectable setting may change a background color of the touch screen display, such as after the user presses a corresponding icon displayed on the touch screen display for either a short or a long press.

An exemplary method of using the handheld electronic luggage scale 500 may be provided as well. The method may include manufacturing the handheld electronic luggage scale, adjusting controls and/or settings on a touch screen display of the luggage scale, attaching the luggage scale to an object to be weighed, lifting the scale and object, and viewing the weight of the object being weighed via the touch screen display. The method may include manufacturing the handheld electronic luggage scale, which may include a handle or outer casing for an electronic scale. Also, manufacturing the handheld scale may include incorporating a curved hook supported by the handle, which may extend vertically below the handle and may be utilized to secure objects to be weighed by the scale. Notably, at least a portion of the hook may be covered in plastic and/or rubber. Additionally, the manufacturing may include incorporating a touch screen display into a top surface of the handle of the luggage scale. The touch screen display may be configured to display the calculated weight of an object suspended from the luggage scale.

Additionally, the method may include adjusting one or more settings and/or controls of the luggage scale via the touch screen display. The touch screen display may be configured to display one or more virtual buttons within the touch screen display. The one or more virtual buttons may be touched by a user to adjust controls and/or settings on the touch screen display. For example, the virtual buttons may be pressed by a user to turn the luggage scale on or off, change a background color of the display of the touch screen, generate visual, auditory, and haptic feedback in response to various operations, and switch between various units of measurements. The method may also include attaching the luggage scale to an object. For example, a user may attach a piece of luggage to the hook of the luggage scale so as to weigh the object. Also, the method may include lifting the scale and the object so that electronic scale components housed within the handle of the scale may calculate the weight of the object. Once the weight has been calculated by the electronic scale components of the scale, the method may include viewing the weight of the object via the touch screen display. The method may include additional, fewer, or alternate actions. Furthermore, the method may incorporate any of the functionality and/or features described in the pre sent disclosure.

The arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The invention claimed is:

1. A handheld electronic luggage scale comprising:
a handle;
a luggage hook attachment that is centrally located on a bottom surface of the handle, the luggage hook attachment protruding from the bottom surface of the handle in a downward direction, wherein the luggage hook attachment is funnel-shaped and tapers so that a radius of the luggage hook attachment is greater in the vicinity of the interconnection of the luggage hook attachment with the bottom surface and smaller in the vicinity of a bottom tip of the luggage hook attachment, and wherein the handle is symmetrically shaped to allow a user to grasp the handle to either or both sides of the luggage hook attachment;
a connector housed within the luggage hook attachment with an opening at one end, wherein the one end of the connector is spaced apart from the bottom surface of the handle by the luggage hook attachment so that the user's fingers grasping the handle do not contact the one end of the connector;

a curved hook having a diameter sized to be accepted by the opening of the connector such that the curved hook is supported by the connector and extends generally vertically below the handle; and an electronic scale housed within the handle, the electronic scale interconnected with the curved hook via the connector for calculating a weight of an object suspended from the curved hook, wherein a touch screen display is provided on a surface of the handle, the touch screen display being configured to display (1) the calculated weight from the electronic scale component, and (2) an icon representing a virtual control button, the virtual control button being configured to adjust a user-selectable setting when the user touches the icon representing the virtual control button for a predetermined period of time.

2. The handheld electronic luggage scale of claim 1, wherein the bottom surface of the handle is curved from the luggage hook attachment centrally located on the bottom surface of the handle to both longitudinal ends of the bottom surface to provide an ergonomic support for the user to lift the object to be weighed.

3. The handheld electronic luggage scale of claim 1, wherein the touch screen display is provided on a top surface of the handle, the virtual control button is a virtual on/off button, and the predetermined period of time is a few seconds.

4. The handheld electronic luggage scale of claim 3 wherein the touch screen display includes a second icon representing a second virtual control button that is configured to switch units of measurement of the object being weighed.

5. The handheld electronic luggage scale of claim 1, wherein the touch screen display includes a battery gauge.

6. The handheld electronic luggage scale of claim 1, wherein the touch screen display is configured to change colors.

7. A handheld electronic luggage scale comprising:
a handle;
an electronic scale component configured to weigh an object, the handle acting as a housing for the electronic scale component;
a luggage hook attachment that is centrally located between a first and a second longitudinal end of the handle, the luggage hook attachment protruding from a bottom surface of the handle in a downward direction, wherein the luggage hook attachment is funnel-shaped and tapers so that a radius of the luggage hook attachment is greater in the vicinity of the interconnection of the luggage hook attachment with the bottom surface and smaller in the vicinity of a bottom tip of the luggage hook attachment, and wherein the bottom surface of the handle is curved on either side of the luggage hook attachment to provide an ergonomic support for a user to lift the object to be weighed;
a connector housed within the luggage hook attachment with an opening at one end, the one end of the connector with the opening extending below the luggage hook attachment, wherein the one end of the connector is spaced apart from the bottom surface of the handle by the luggage hook attachment so that the user's fingers grasping the handle do not contact the one end of the connector;
a curved hook having a diameter sized to be accepted by the opening of the connector such that the curved hook is supported by the connector and interconnected with the electronic scale component via the connector, the curved hook extending generally vertically below the handle; and
a touch screen display provided in a top surface of the handle, wherein the touch screen display is configured to display a calculated weight of the object being lifted via the curved hook from the electronic scale component, the touch screen display includes an icon representing a virtual control button that (1) controls a user-selectable setting, and (2) provides at least one of auditory, visual, and haptic feedback when the user-selectable setting changes due to the user pressing the virtual control button for a predetermined period of time.

8. The handheld electronic luggage scale of claim 7, wherein the curved hook comprises a large hook portion having a bottom curved hook extending at least approximately 180 degrees radially, the bottom curved hook configured to hook a handle or strap on the object.

9. The handheld electronic luggage scale of claim 8, wherein the curved hook comprises a small hook portion having a top curved hook extending from the large hook portion, the vertical alignment of the small hook portion and the vertical alignment of the large hook portion being approximately 90 degrees offset with respect to each other.

10. The handheld electronic luggage scale of claim 7, wherein the touch screen display includes two icons representing two virtual control buttons, each of the two virtual control buttons being configured to change an associated user-selectable setting.

11. The handheld electronic luggage scale of claim 7, wherein the virtual control button is a virtual on/off button, and the predetermined period of time is a few seconds.

12. The handheld electronic luggage scale of claim 7, wherein the virtual control button is configured to change a unit of measurement of the weight of the object being weighed by the electronic scale component.

13. The handheld electronic luggage scale of claim 7, wherein the user-selectable setting changes a background color of the touch screen display.

14. A handheld electronic luggage scale, comprising:
a handle comprising top and bottom surfaces, and extending along a longitudinal length between first and second longitudinal ends, and further comprising a luggage hook attachment that is centrally located on the bottom surface between the first and second longitudinal ends, the luggage hook attachment protruding downwardly from the bottom surface, the luggage hook attachment being funnel-shaped and tapering so that a radius of the luggage hook attachment is greater in the vicinity of the interconnection of the luggage hook attachment with the bottom surface and smaller in the vicinity of a bottom tip of the luggage hook attachment, the bottom surface of the handle being curved from the luggage hook attachment along the longitudinal length to both the first and second longitudinal ends to provide an ergonomic support for a user to lift an object to be weighed, and the handle is symmetrically shaped about the luggage hook attachment to allow the user to grasp the handle to either or both sides of the luggage hook attachment;
a connector housed within the luggage hook attachment and comprising a lower end that extends below the bottom tip of the luggage hook attachment, the luggage hook attachment providing physical separation between the bottom surface of the handle and the lower end of the connector so that the user's fingers grasping the handle do not contact the lower end of the connector;

a luggage hook for suspending the object to be weighted, the luggage hook coupled to the lower end of the connector and extending generally vertically below the handle;

an electronic scale component housed within the handle, the electronic scale component coupled to the connector and configured to calculate a weight of the object suspended from the luggage hook; and a display arranged on the top surface of the handle, the display configured to display the weight of the object calculated by the electronic scale components, wherein the display is a touch screen display, the touch screen display comprising a virtual control button, the virtual control button being configured to change a user-selectable setting of the handheld electronic luggage scale when the user presses the virtual control button for a predetermined period of time.

15. The handheld electronic luggage scale of claim 14, wherein the virtual control button is a virtual on/off-button, and the predetermined period of time is a few seconds.

\* \* \* \* \*